Figure 1:
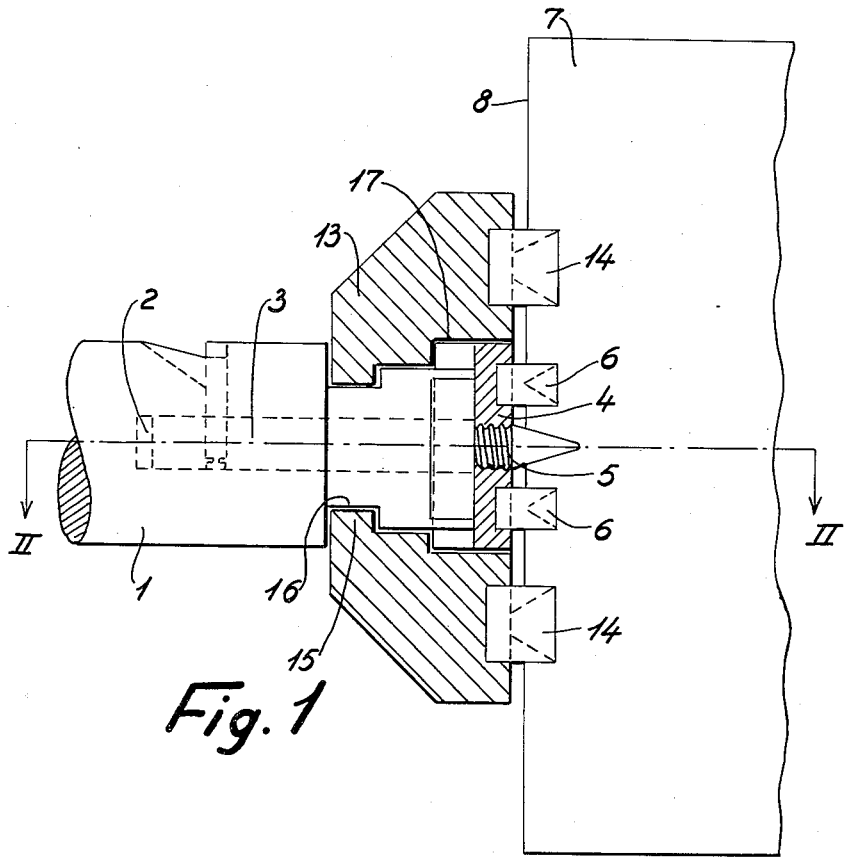

July 17, 1962  F. WIECKMAN ETAL  3,044,511
CHUCK ASSEMBLIES FOR MOUNTING ON THE SPINDLE
OF A VENEER CUTTING LATHE
Filed Oct. 12, 1960  2 Sheets-Sheet 1

INVENTORS
Frederic Wieckman
Alfred Felix Plato

BY
Watson, Cole, Grindle & Watson
ATTORNEYS

United States Patent Office 3,044,511
Patented July 17, 1962

3,044,511
CHUCK ASSEMBLIES FOR MOUNTING ON THE SPINDLE OF A VENEER CUTTING LATHE
Frederic Wieckman and Alfred Felix Plato, Sonderborg, Denmark, assignors to Kristian Staerk A/S, Copenhagen, Denmark
Filed Oct. 12, 1960, Ser. No. 62,177
Claims priority, application Denmark Oct. 13, 1959
4 Claims. (Cl. 144—209)

This invention relates to a chuck assembly for mounting on the spindle of a veneer cutting lathe and having log piercing elements for engaging the end face of a log, the said chuck assembly comprising at least two face plates one of which extends radially beyond the other, the inner face plate being adapted to be locked to the spindle and, upon release of such locking, to be removed from the spindle by an axial movement.

In a known chuck assembly of this kind the outer face plate is mounted on the side of the inner face plate facing away from the spindle, the piercing elements or dogs of the latter engaging recesses of the outer face plate. Thereby the chuck assembly acquires dimension such that it may be used for the peeling of a very thick log. When this has been peeled down to the outer diameter of the outer face plate, it is necessary completely to disengage the log from the veneer cutting lathe, because the outer face plate can only be removed after both of the face plates have been retracted from the end face of the log.

This known chuck assembly suffers from the drawback that it is necessary completely to disengage the log in order to remove the outer face plate, which is not only inconvenient but also involves considerable risk of splitting of the log owing to the renewed piercing of the dogs into the end face of the log already scarred from the first engagement of the dogs therein.

It is the object of the present invention to devise a chuck assembly of the type referred to in which the outer face plate may be removed without any necessity of first releasing the log from the lathe. With this object in view, according to the invention, the outer face plate is constructed with means for attaching same to the spindle and for holding it against axial displacement, the inner face plate being mounted for axial displacement relative to the outer face plate in a direction away from the spindle. With a chuck assembly constructed in this manner the inner face plate may be released from the spindle while maintaining the outer face plate in axially locking engagement therewith, and when the spindle is then retracted by control means belonging to the lathe, the outer face plate will be disengaged from the end surface of a partly peeled-down log while the inner face plate remains in engagement with the log and performs an axial movement relative to the outer face plate and thereby relative to the spindle, thereby maintaining the log supported in the lathe during retraction of the spindle, it being understood that the said axial movement is smaller than that necessary for completely removing the inner face plate from the spindle. Since the outer face plate has now been disengaged from the end face of the log, it can be removed from the spindle and the latter can then again be advanced whereby the inner face plate takes over the whole transfer of power to the log for the continued peeling operation. Thus, a very considerable simplification of the peeling operation is achieved and, moreover, the danger of splitting of the log is reduced, because the inner face plate remains constantly engaged with the end face of the log during the whole of the peeling operation.

In a preferred embodiment of the invention, the outer face plate has a radially disposed slot, the side walls of which engage with radially disposed grooves in the circumferential surface of the spindle. In this manner the outer face plate is firmly and reliably held against axial displacement relative to the spindle when being retracted from the log and, moreover, the outer face plate is easily removable from the spindle by being withdrawn from the latter in a radial direction.

According to the invention, the inner end of the slot may be constructed with an enlarged portion surrounding the inner face plate along more than 180° of the circumference thereof. Owing to this arrangement, the outer face plate is also held against radial displacement when the inner face plate is in position within the outer face plate.

Figure 4:
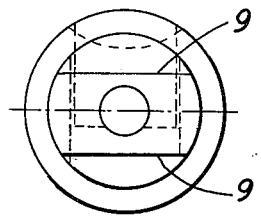
Figure 2:
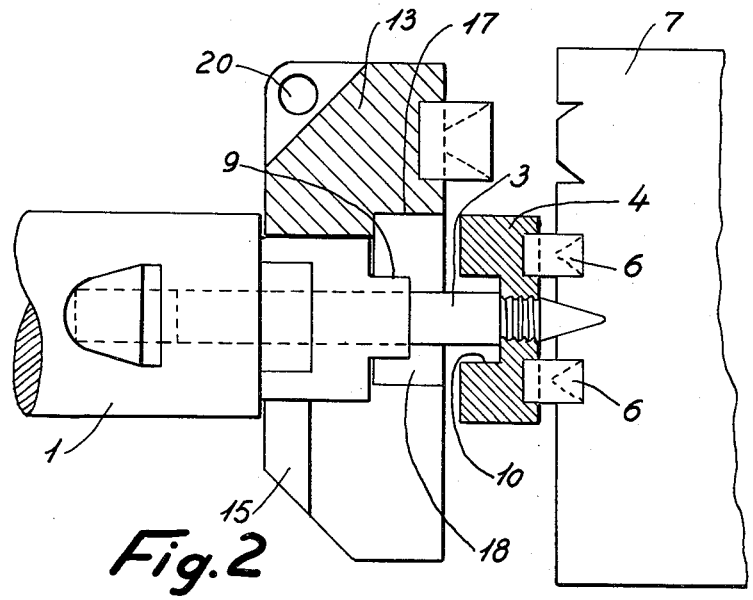
Figure 3:
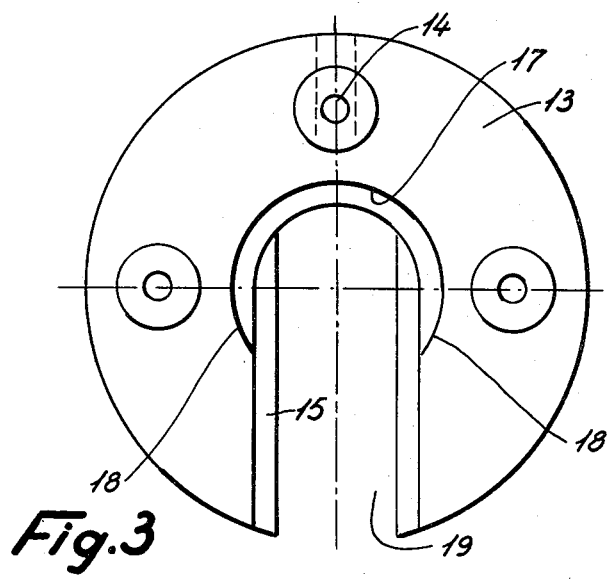

The invention will now be described in further detail with reference to the accompanying drawings in which—
FIG. 1 shows one constructional form of a chuck assembly according to the invention, in side view and partly in section,
FIG. 2 a section along the line II—II of FIG. 1, the assembly being in position for removal of the outer face plate,
FIG. 3 an outer face plate of the chuck assembly, in front view,
FIG. 4 a spindle of a veneer cutting lathe in front view, and
FIG. 5 a locking member in plane view.

1 is the spindle of a veneer cutting lathe which spindle is adapted in well known manner to be axially moved by hydraulic or mechanical control means, not shown in the drawing. In the end of the spindle 1, an axial bore 2 is provided for slidably receiving a pin 3 which at its front end carries an inner face plate 4 having a relatively small outer diameter, the said inner face plate 4 being connected with the pin 3 by means of a screw-thread 5. The face plate 4 is constructed with piercing elements or dogs 6 for driving into the end face 8 of a log 7 to be peeled so that the log 7 will be rotated together with the face plate 4. For transferring the rotary movement of the spindle 1 to the face plate 4, the spindle is constructed at its front end with two surfaces 9, FIG. 4, disposed parallel to a diametrical plane, the said surfaces engaging with a groove 10 on the rear side of the face plate 4, FIG. 2, in order to transmit the drive.

Figure 5:
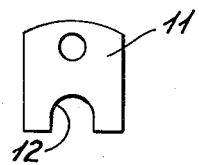

In the position of the face plate 4 illustrated in FIG. 1, the face plate may be axially locked in the spindle bore 2 by means of a locking member 11, FIG. 5, the spindle being provided with a radial passage through which the locking member 11 may be introduced until the edge of a notch 12 of the locking member 11 engages a circumferential groove of the pin 3.

The face plate 4 is surrounded by an outer face plate 13 which is also provided with dogs 14. The outer face plate 13 has a slot 19 permitting this face plate 13 to be slid on to the spindle 1 from the side. During this sliding movement projecting ledges along the sides of the slot 19 slide in radially disposed grooves 16 of the spindle 1. When the face plate 13 has been slid into position in this manner it will be axially locked relative to the spindle. At its inner end the slot 19 has an enlarged portion 17, the diameter of which corresponds to the outer diameter of the inner face plate 4. When the inner face plate 4 is moved into the enlarged portion 17 of the slot, the outer face plate 13 will be locked in a radial direction, too.

The operation of the described chuck assembly is as follows.

When a thick log is to be peeled, both of the face plates 4 and 13 are mounted on the spindle 1 and the latter is advanced towards the end face 8 of the log 7 by operating the hydraulic or mechanical control means previously referred to, whereby the dogs 6 and 14 are driven into engagement with the log. When the spindle 1 is thereafter rotated, the rotary motion will be transferred to the outer face plate 13 via the bottoms of the grooves 16 and the opposed faces of the projecting ledges 15 at the middle of the face plate 13. The rotary motion is transferred from the spindle 1 to the inner face plate 4 via the surfaces 9 engaging with the groove 10 on the rear side of this face plate 4. When the log 7 has been peeled down so that its diameter corresponds approximately to the outer diameter of the outer face plate 13, the spindle 1 is retracted from the log 7 in the axial direction, and owing to the engagement of the grooves 16 and the ledges 15 the outer face plate 13 will follow the movement of the spindle so that its dogs are retracted from the log. At the same time the pin 3 is partly withdrawn from the spindle bore 2 because the dogs of the face plate 4 remain engaged with the end surface of the log, and thereby the inner face plate 4 is withdrawn from the enlarged portion 17 of the slot 19 so that the parts 18 of the latter indicated below the horizontal centerline in FIG. 3 no longer lock the outer face plate 13 against withdrawal in a radial direction. The outer face plate is then removed by means of a tool hooked into a hole 20 of the face plate. The spindle 1 is now again advanced towards the log until the surfaces 9 and the groove 10 are engaged with one another. The inner face plate 4 is now again circumferentially locked relative to the spindle so that it is again possible to transfer a torque to the log. The locking member 11 is introduced through the said passage for engagement with the pin 3 so that the latter is now axially locked in the spindle. When the peeling has been completed, the spindle 1 is again retracted, and this time the retracting movement will be transferred to the inner face plate 4 via the locking member 11 so that the inner face plate 4 is now retracted from the log.

In the drawing only one spindle and chuck assembly is illustrated but it will be understood that a veneer cutting lathe will comprise two such spindles with chuck assemblies, one at each end of the log, and these spindles are moved successively or simultaneously when withdrawing the face plate 13.

We claim:

1. A chuck assembly for veneer cutting lathes comprising an inner face plate mounted at the end of the spindle of a veneer cutting lathe in such a manner as to be axially displaceable relative thereto from an operating position in a direction away from the end of the spindle, means for optionally axially locking said inner face plate to said spindle in its operating position, an outer face plate surrounding said inner face plate along more than 180° of the circumference thereof in the operating position thereof, said outer face plate having a radially disposed slot permitting same to be slid onto said spindle from the side, co-operating locking means being provided on said outer face plate and said spindle for axially locking said outer face plate relative to said spindle when slid into operating position thereon, both of said face plates being provided with wood piercing elements.

2. A chuck assembly for veneer cutting lathes comprising an inner face plate mounted at the end of the spindle of a veneer cutting lathe and having means for slidably supporting said inner face plate on said spindle between a first position adjacent the end of the said spindle and a second position spaced axially beyond said end, and means for locking said inner face plate to the spindle in the first position, an outer face plate carried by said spindle and projecting radially beyond said inner face plate, releasable means being provided for locking said outer face plate in fixed relation to said spindle, and means for permitting radial withdrawal of said outer face plate from said spindle when the inner face plate is in its said second position, both of said face plates being provided with wood piercing elements.

3. In a chuck assembly for veneer cutting lathes having rotating spindle, said chuck assembly comprising an outer face plate provided with an opening through one side permitting its application to and removal from said lathe spindle in a radial direction with respect to the spindle, and means for locking said outer face plate against radial movement on said spindle.

4. A chuck assembly for a veneer cutting lathe having a rotating free ended spindle, comprising a relatively small diameter inner face plate mounted at the free end of said spindle for relative axial movement to and from operative positions with respect to the spindle, said spindle and said plate having cooperating means interlocking to retain said inner plate against rotation on the spindle in such operative position, an outer face plate formed with a slot opening radially to one side for permitting radial movement of the outer face plate to and from operative position on said spindle, said inner and outer face plates having portions interlocking in the said operative positions of said inner and outer face plates to prevent radial removal of the outer face plate from the spindle, and means interconnecting the spindle and said outer face plate against rotating movement in the operative position of the latter.

References Cited in the file of this patent
UNITED STATES PATENTS

| | | |
|---|---|---|
| 412,553 | Smith | Oct. 8, 1889 |
| 2,879,816 | Cook et al. | Mar. 31, 1959 |